United States Patent

Westcott

[15] 3,676,765

[45] July 11, 1972

[54] TACHOMETER GENERATOR

[72] Inventor: Vernon C. Westcott, Lincoln, Mass.

[73] Assignee: Trans-Sonics, Inc., Lexington, Mass.

[22] Filed: June 30, 1970

[21] Appl. No.: 56,100

Related U.S. Application Data

[63] Continuation of Ser. No. 835,133, June 20, 1969, abandoned.

[52] U.S. Cl..................................322/58, 322/93, 310/168, 330/112

[51] Int. Cl. ........................................................H02k 11/00

[58] Field of Search................310/168, 169, 170, 66, 181, 310/171, 154, 155, 156; 322/58, 32, 93; 324/70; 340/62, 271; 330/58, 30 D, 69, 112

[56] References Cited

UNITED STATES PATENTS

| | | | |
|---|---|---|---|
| 2,913,662 | 8/1956 | Hogan | 340/271 |
| 1,892,371 | 12/1932 | Tuczek | 310/168 UX |
| 3,132,337 | 5/1964 | Martin | 310/170 |
| 2,556,471 | 6/1951 | Elam | 310/155 |
| 3,486,054 | 12/1969 | Livingston | 310/71 |
| 3,553,492 | 9/1967 | Bugay | 330/30 D |

FOREIGN PATENTS OR APPLICATIONS

| | | | |
|---|---|---|---|
| 1,088,106 | 10/1967 | Great Britain | 310/168 |
| 1,374,774 | 8/1964 | France | 310/168 |
| 1,336,035 | 10/1962 | France | 310/168 |

Primary Examiner—J. D. Miller
Assistant Examiner—R. Skudy
Attorney—Cesari and McKenna

[57] ABSTRACT

A tachometer generator for use in a high noise environment comprises a multi-pole rotor of magnetic material and a single-pole stator. The stator includes a magnet arranged to pass flux through the stator and into the rotor, and a coil that develops a voltage in response to changes in the stator flux. Movement of the rotor poles past the stator provides changes in reluctance that are reflected in changes in the stator flux. The coil thereby develops a signal whose frequency is proportional to the rotational speed of the rotor. This signal is applied to a signal-conditioning amplifier housed with the stator. The amplifier has a high gain and hysteresis, which combine to provide a square wave output having a large amplitude and substantially immune to noise picked up by the generator.

6 Claims, 3 Drawing Figures

INVENTOR
VERNON C. WESTCOTT
BY
*Blair, Cesari & St.Onge*
ATTORNEYS

TACHOMETER GENERATOR

This is a continuation of an application No. 835,133 filed on June 20, 1969, now abandoned.

BACKGROUND OF THE INVENTION

1. Field of the Invention

This invention relates to a tachometer and a tachometer generator. More specifically, it relates to a low-cost tachometer generator for use in environments that are rigorous from both a mechanical and an electrical standpoint. A typical application is measurement of the speed of an automobile axle or drive shaft with the output of the tachometer generator being used in an electronic anti-skid brake control. The generator must stand up to mechanical shock, temperature extremes, moisture, and bombard-ment with all kinds of materials picked up from road surfaces, all of which may affect the accuracy of its output. Also, it must be largely immune from the electrical noise so prevalent in and underneath moving automobiles.

Anti-skid systems, with which the invention is primarily concerned, have only recently been introduced on a significant commercial basis. A system of this type senses the speed of the rear wheels. If either wheel begins to slow up too rapidly, e.g., faster than the automobile can decelerate, there is an incipient skid. Therefore, when this condition occurs, the system momentarily relieves the hydraulic pressure on the brake cylinders, so as to keep the wheels rotating and hereby preventing the skid. A tachometer generator used for sensing wheel speed is thus the heart of the system. The generator must provide an accurate speed-indicating signal in the face of the various noise generating factors characteristic in an automobile environment. It is to be an improved tachometer generator that the present invention is directed.

2. Prior Art

Prior to the present invention, tachometer generators used in brake control systems have been of fairly conventional design, with a multiple-pole rotor surrounded by a stator having the same number of poles. A large number of poles is required in order to provide a signal having sufficient frequency and amplitude at low speeds. This results in a relatively high cost, both in making the various parts and in winding the stator coil, as well as in assembling the rotor and stator.

The cost problem is compounded by an assembly problem peculiar to automotive usage. Specifically, the stator cannot be assembled with the rotor at the same time and place that the rotor is mounted on the shaft whose speed is to be monitored. Therefore, the stator, which completely encircles the rotor in the assembled generator, must be loosely carried on the shaft until the latter is assembled to the housing that is to support that stator. The shaft must therefore be handled carefully to prevent damage to the stator.

Furthermore, a fairly intricate assembly operation may be required to position the stator properly with respect to the rotor when the stator is finally fastened into place. For example, a slight cocking of the stator with respect to the rotor may materially reduce the output voltage of the generator because of the resulting misalignment between the stator and rotor poles.

Accordingly, a principal object of the invention is to provide a tachometer generator characterized by both a highly accurate output signal and a low cost of construction.

A further object of the invention is to provide a tachometer generator that is well suited for difficult environmental conditions, such as those encountered underneath an automobile.

A further object of the invention is to provide a tachometer generator that is well suited for the assembly techniques applied to the parts of the automobile to which the generator is attached.

Yet another object of the invention is to provide a tachometer generator of the above type whose output is suitable for use in a brake control system.

Other objects of the invention will in part be obvious and will in part appear hereinafter.

SUMMARY OF THE INVENTION

A tachometer generator embodying the invention comprises a rotor in the form of a toothed ring fitted to the shaft (or axle) whose speed is to be measured; a stator having a single pole positioned adjacent to the periphery of the rotor; and an electronic unit that amplifies and shapes the speed-indicating signal and also provides it with a high degree of noise immunity.

The rotor ring is made of magnetic material, and generally the shaft on which the ring is mounted is also of magnetic material. The rotor teeth serve as pole pieces which move past the stator pole as the shaft rotates, thereby varying the reluctance of the magnetic path between the stator and rotor. The stator carries a magnet arranged to pass a magnetic flux between the stator pole piece and the rotor, the magnetic field returning to the opposite end of the stator magnet largely by way of leakage paths.

Thus, the flux between the stator and rotor increases and decreases in response to the changes in reluctance resulting from movement of the rotor teeth by the stator. A coil on the stator develops a voltage in response to these flux changes, and the frequency of this signal is proportional to the rotational speed of the shaft.

An amplifier, mounted on the stator and connected to amplify the voltage induced in the stator coil, is provided with a high degree of positive feedback. This greatly increases the effective gain of the amplifier for small signals and thereby provides it with a substantial amount of hysteresis. As a result, the amplifier output, which is the output of the generator, has the form of a square wave of fairly large amplitude to which other electronic devices in a brake control system can easily respond. Moreover, as discussed below, the hysteresis confers a substantial degree of noise immunity on the generator output, in that it prevents noise of various types picked up in the generator from altering the apparent frequency of the output.

This arrangement provides a number of important advantages. In the first place, the generator has a large-amplitude, well-defined output, and yet, at the same time, has a simple mechanical structure that is materially less expensive than the prior generators using multiple-pole, ring-like stators. Also, with a single pole the stator can be assembled to the rotor at any time; there is no need to carry the stator with the rotor through automobile assembly operations prior to the time the stator is fixed in place. The generator is thus more compatible with automotive assembly arrangement than is the prior generator used in brake control systems. Indeed, it is quite feasible to provide the brake control system as an optional accessory merely by installing the low-cost rotor ring on every shaft or axle and then later installing the stator if the purchaser has indicated a desire for the system.

Additionally, the invention diminishes the tolerance problem in assembling the stator to the rotor, since cocking of the stator will ordinarily not reduce the generator output to the same degree as the cocking of a stator that extends all the way around the rotor.

For a fuller understanding of the nature and objects of the invention, reference should be had to the following detailed description taken in connection with the accompanying drawings, in which.

DESCRIPTION OF THE PREFERRED EMBODIMENT

Figure 1:
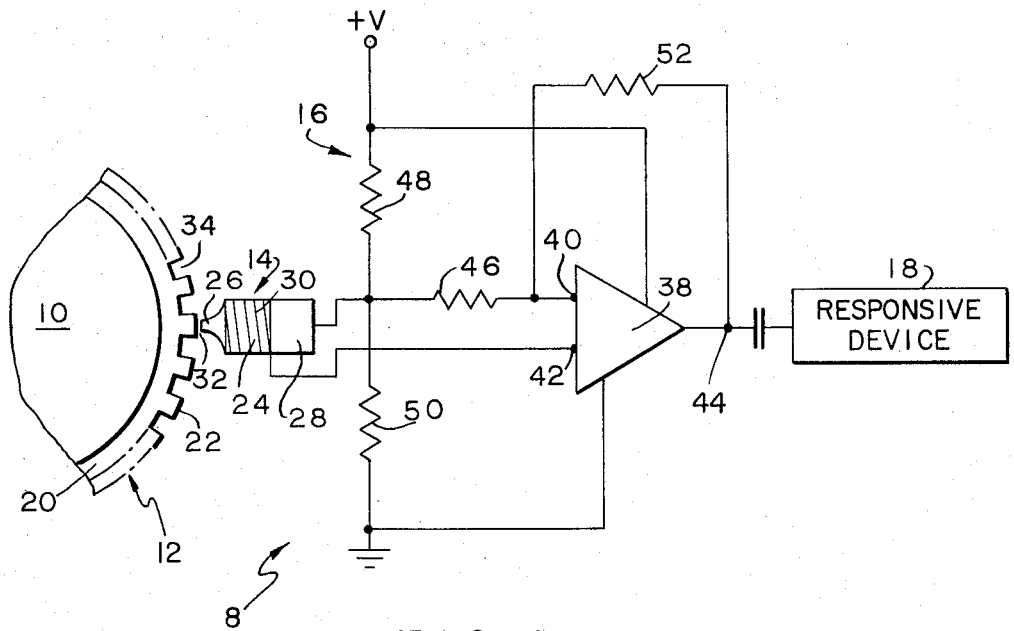
FIG. 1 is a schematic diagram of a tachometer generator incorporating the invention.

As shown in FIG. 1, a tachometer generator 8 used in sensing the speed of a shaft 10 comprises a rotor 12, a stator 14 closely spaced from the periphery of the rotor 12, and an electronic signal conditioning unit 16 that conditions signals from the stator 14. A tachometer including the generator 8 includes a responsive device 18 which, in its simplest form, may be an indicating meter. In the context of the present invention, however, the device 18 comprises the control circuitry for an anti-skid brake system in an automobile.

The rotor 12 is in the form of a ring 20, fitted to the shaft 10 and having a series of radially projecting teeth 22. The ring 20 and teeth 22 are made of material, such as iron, having a high magnetic permeability. The shaft 10 will also ordinarily be of a soft ferromagnetic material and in that case may also be considered as an operative part of the rotor 12. The stator 14 includes a high permeability core 24 shaped at its rightward end to form a pole piece 26 having a cross section compatible with that of the teeth 22. A permanent magnet 28 is affixed to the opposite end of the core 24, and a coil 30 is disposed around the core to develop a voltage in response to flux changes in the core.

More specifically, flux from the magnet 28 passes through the core 24 and into the rotor 12 by way of the intervening air gap 32. The length (radial direction) of the air gap is substantially less when a tooth 22 is opposite the stator pole piece 26 than when an intervening space 34 is opposite the pole piece. The reluctance of the air gap 32 thus decreases and increases as successive teeth 22 and gaps 34 proceed past the pole piece 26 during rotation of the shaft 10. The flux through the core 24 increases and decreases with these changes in reluctance, and this induces a voltage in the coil 30. The frequency is directly proportional to the rotational speed of the shaft 10.

The magnet 28 need not be a permanent magnet. An electromagnet can also be used. In that case, a magnet coil can be wound on the core 24 along with the coil 30. In fact, the coil 30 alone can be connected to provide both the flux generating and sensing functions.

As noted above, the tachometer generators previously used in automotive brake control systems have employed stators extending all the way around the rotors, with each stator having the same number of poles as its associated rotor in order to develop a speed-indicating signal of sufficient strength. However, we have found that a single-pole stator provides a signal of sufficient strength, along with obvious advantages in terms of construction and installation costs. In fact, the costs are substantially less, even with the electronic unit 16, which is preferably located in the stator housing as described below.

The electronic unit 16 comprises an amplifier 38 having a pair of input terminals 40 and 42 and an output terminal 44. Except as discussed below, the constructional details of the amplifier are not important. The amplifier should have a high gain, e.g., 10,000, and in the circuit illustrated in FIG. 1 the voltage at its output terminal corresponds to the difference between the voltages at its input terminals 40 and 42. The amplifier is readily procured in integrated circuit form, and therefore it is small and inexpensive.

One end of the coil 30 is connected directly to the input terminal 42 and the other end is connected to the input terminal 40 by way of a series resistor 46. Bias at the input of the amplifier is provided by a voltage divider comprising a air of resistors 48 and 50, the bias being obtained from an automobile battery (not shown) that also provides power for the amplifier 38. A resistor 52 connected between the output terminal 44 and the input terminal 40 provides positive feedback, the feedback ratio corresponding approximately to the ratio of the resistances $R_{52}$ and $R_{46}$.

The gain of the amplifier 38 and the degree of positive feedback are preferably sufficient to provide hysteresis in operation of the amplifier. Specifically, as the instantaneous voltage induced in the coil 30 increases to a positive threshold value (terminal 40 positive with respect to terminal 42) that voltage, plus the voltage fed back from the output terminal 44 is sufficient to drive the amplifier to saturation in one direction, with the voltage at the terminal 44 reaching approximately the power supply value. The output voltage thus remains the same as the input voltage continues to increase and further as it decreases back to the original threshold value. It also remains at that level even as the voltage decreases below the threshold value, because the feedback voltage is sufficient to maintain the saturation condition even in the absence of an input signal.

Then as the voltage from the coil 30 reverses polarity, and increases in the negative direction, it reaches a negative threshold level sufficient to overcome the feedback voltage and terminate the saturation condition of the amplifier 38. Now, however, the value of the feedback voltage is such as to move the amplifier to "saturation" in the opposite direction, with the output terminal 44 at approximately ground potential. The output voltage then continues at this level until the positive threshold value of the input signal is again exceeded, at which point the voltage shifts back to its upper level.

Thus, the output voltage of the amplifier 38 has the form of a square wave whose amplitude is roughly the battery voltage. This signal can be transmitted to a responsive device 18 without significant degradation by noise picked up in transmitting the speed-indicating signal to the responsive device 18. Also, the output of the amplifier is relatively unaffected by input noise. Such noise might take the form of pickup by the coil 30, disturbances in the electrical system of the automobile, and electro-mechanical noise caused by damage to the rotor or stator.

The immunity to noise results from the fact that the noise, in general, will be of insufficient amplitude to change the state of the amplifier 38. Except in the intervals in which the output of the coil 30 is between the positive and negative threshold levels, noise cannot change the state of the amplifier unless its effective voltage exceeds the difference between the two threshold levels. Its only effect when the coil voltage is between the two threshold levels is to change the timing of a transition between the two states of the amplifier 38. Thus, noise will ordinarily not cause the amplifier to change states more often or less often than it should in response to the signal from the coil 30. In other words, the frequency of the output of the amplifier 38 is largely unaffected by noise, and therefore it accurately reflects the speed of the shaft 10.

It should be noted that positioning the electronic unit 16 at the stator also helps in rejecting noise, since it eliminates from the low-signal level part of the system the noise that would otherwise be picked up in leads extending from the stator to the electronic unit.

Thus, three factors — namely, the noise rejection provided by the electronic unit 16, the location of the electronic unit 16 at the stator 14, and the large amplitude of the output of the electronic unit — combine to provide a signal for the responsive device 18 that is essentially noise-free.

Figure 2:
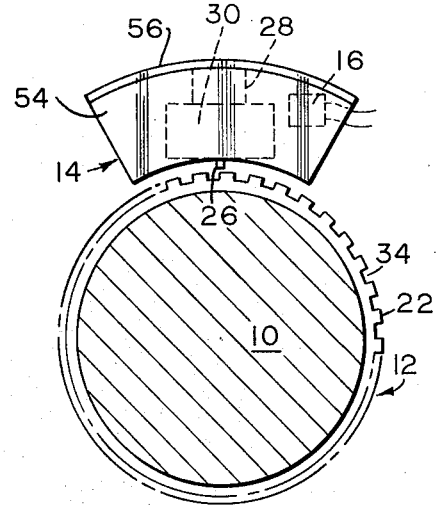
FIG. 2 is an end view of the generator, taken along the axial direction of a shaft whose speed is to be measured.
Figure 3:
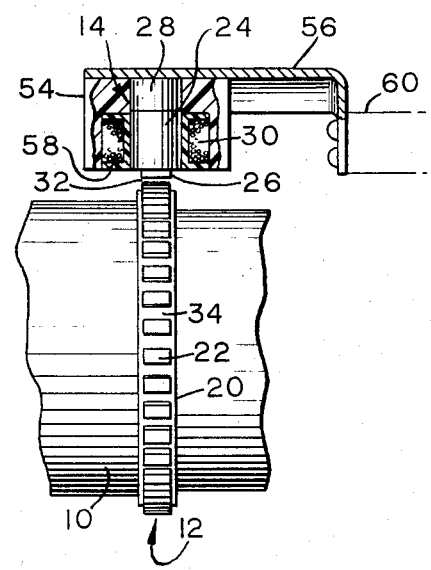
FIG. 3 is a side view of the generator, partly in section.

FIGS. 2 and 3 illustrate the simplicity of the mechanical construction of the tachometer generator. The rotor 12 is press-fitted onto a shoulder 10a of the shaft 10. The stator 14 is contained in a small housing 54 held in place by a suitable bracket 56. The housing contains the core 24, magnet 28 and a bobbin 58 on which the coil 30 is wound, in addition to the electronic unit 16. The pole piece 26 projects from the inner surface of the housing 54.

The stator 14 can easily be fitted into place by fastening the bracket 56 to a member 60. The member 60 is fixed with respect to the shaft 10, except for rotation of the shaft. For example, it may be a bearing housing for the shaft. Installation of the stator 14 is a simple task because it overlies only a small part of the rotor. Moreover, it is easily lined up with the rotor within the applicable tolerances.

It will thus be seen that the objects set forth above among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

I claim:

1. A tachometer generator comprising
  A. a rotor
    1. fixed to a rotating member for rotation therewith, and
    2. having a plurality of poles extending therefrom,
  B. A stator including
    1. a core of high permeability material, 2. a pole piece extending from said core toward said rotor poles,
3. a magnet arranged to pass a magnetic field between said stator pole piece and said rotor poles by way of said core, and
4. a coil positioned to sense changes in the magnetic flux in said core, whereby said coil develops a speed-indicating signal corresponding to the changes in magnetic flux in said core resulting from movement of said rotor poles past said stator pole piece, C. a signal conditioning unit
1. deriving its input from said coil,
2. providing a high gain for said speed-indicating signal,
3. having first and second output voltage levels,
   a. developing said first output level in response to an input voltage in excess of a first threshold level,
   b. developing said second output level in response to a second input threshold level substantially different from said first threshold level, thereby to provide a hysteresis effect in switching between said output levels,
4. whereby said signal conditioning unit provides an output for said tachometer generator having a substantial amplitude and largely free of the effects of noise in the input to said conditioning unit.

2. The generator defined in claim 1 including a housing containing
A. said stator, and
B. said signal conditioning unit.

3. A tachometer generator comprising:
A. a rotor
1. fixed to a rotating member for rotation therewith, and
2. having a plurality of poles extending therefrom,
B. a stator including
1. a magnet arranged to pass a magnetic flux between said stator and said rotor poles, and
2. a coil positioned to sense changes in the magnetic flux, whereby said coil develops a speed-indicating signal corresponding to the changes in magnetic flux resulting from movement of said rotor poles past said stator,
C. a signal conditioning unit
1. deriving its input from said coil,
2. providing a high gain for said speed-indicating signal,
3. having first and second output voltage levels,
   a. developing said first output level in response to an input voltage in excess of a first threshold level,
   b. developing said second output level in response to a second input threshold level substantially different from said first threshold level, thereby to provide a hysteresis effect in switching between said output levels,
4. whereby said signal conditioning unit provides an output for said tachometer generator having a substantial amplitude and largely free of the effects of noise in the input to said conditioning unit.

4. The generator defined in claim 3 including a housing containing
A. said stator, and
B. said signal conditioning unit.

5. A tachometer generator comprising
A. a rotor
1. fixed to a rotating member for rotation therewith, and
2. having a plurality of poles extending therefrom,
B. a stator including
1. a core of high permeability material,
2. a pole piece extending from said core toward said rotor poles,
3. a magnet arranged to pass a magnetic field between said stator pole piece and said rotor poles by way of said core, and
4. a coil positioned to sense changes in the magnetic flux in said core, whereby said coil develops a speed-indicating signal corresponding to the changes in magnetic flux in said core resulting from movement of said rotor poles past said stator pole piece,
C. a signal conditioning unit
1. connected to amplify said speed-indicating signal,
2. positioned proximate to said stator, and
3. having first and second output levels and a substantial degree of hysteresis in switching between said output levels, thereby to minimize the effect of noise on the output of conditioning unit.

6. A tachometer generator comprising:
A. a tachometer
1. fixed to a rotating member for rotation therewith, and
2. having a plurality of poles extending therefrom,
B. a stator including
1. a magnet arranged to pass a magnetic flux between said stator and said rotor poles, and
2. a coil positioned to sense changes in the magnetic flux resulting from movement of said rotor poles past said stator,
C. a signal conditioning unit
1. connected to amplify said speed-indicating signal,
2. positioned proximate to said stator, and
3. having first and second output levels and a substantial degree of hysteresis in switching between said output levels, thereby to minimize the effect of noise on the output of said conditioning unit.

* * * * *